United States Patent [19]

Goldwasser

[11] Patent Number: 4,487,585
[45] Date of Patent: Dec. 11, 1984

[54] EDUCATIONAL TOY HAVING FRAGRANCE ASSOCIATION MEANS

[75] Inventor: Edward M. Goldwasser, Los Angeles, Calif.

[73] Assignee: Small World Toys, Culver City, Calif.

[21] Appl. No.: 573,426

[22] Filed: Jan. 24, 1984

[51] Int. Cl.³ ............................ G09B 1/06; A63F 9/10
[52] U.S. Cl. .................................. 434/259; 273/156; 434/346
[58] Field of Search ............... 434/259, 346, 167, 178; 273/157 R, 156

[56] References Cited

U.S. PATENT DOCUMENTS

| 3,570,139 | 3/1971 | Ladd et al. | 434/346 |
| 4,194,301 | 3/1980 | Caldwell | 434/178 X |
| 4,243,224 | 1/1981 | Spector | 273/157 R |
| 4,306,868 | 12/1981 | Hankins | 434/167 X |
| 4,348,191 | 9/1982 | Lipsitz et al. | 434/259 X |

Primary Examiner—William H. Grieb
Attorney, Agent, or Firm—Fulwider, Patton, Rieber, Lee & Utecht

[57] ABSTRACT

An educational and recreational toy particularly for young children is provided for associating common subjects or shapes with related fragrances. The toy includes a series of uniquely shaped game pieces bearing familiar pictorial subject matter for seated reception within complementary-shaped recesses in a game board. Removal of a game piece from its associated board recess exposes a fragrance sticker adhered to the board and having a chemically coated front surface which, when lightly scratched, emits a familiar fragrance correlated with the shape and/or pictorial subject matter of the removed piece.

18 Claims, 3 Drawing Figures

EDUCATIONAL TOY HAVING FRAGRANCE ASSOCIATION MEANS

This invention relates generally to educational and recreational toys designed primarily for use by young children. More specifically, this invention relates to a children's shape and/or subject recognition toy having common shapes or subjects associated with familiar fragrances.

Shape and object recognition toys for children are well known in the art and commonly include a number of game pieces having different shapes to fit respectively into recesses or holes formed in a base structure, such as a generally two-dimensional game board or a hollow three-dimensional box or the like. In some designs, the game pieces have recognizable geometric shapes, such as circles, squares, triangles, and the like, whereas in other designs the game pieces bear pictorial or graphic information representing familiar subjects or objects, such as animals, toys, foods, and the like. Fitting of the game pieces into the appropriate positions in the base structure requires the child to utilize a variety of mental skills, particularly such as shape and subject association, all in a manner which is both recreational and educational. In addition, such toys provide valuable training in fine motor control, since a relatively high degree of manual dexterity is required to orient and fit the game pieces into the proper positions in the base structure.

In recent years, a variety of children's products have become available in which familiar pictorial information is associated with common related fragrances. In particular, selected pictorial information appearing, for example, in a story book or on the exposed face of a jigsaw puzzle, is correlated with related smells by inclusion of so-called fragrance stickers having chemical-coated front surfaces designed to emit predetermined fragrances when lightly scratched. By including these fragrance stickers as integral portions of pictorial illustrations familiar to a child, a highly entertaining educational dimension of picture and fragrance association results.

The object of the present invention is to increase or enhance the educational and recreational aspects of fragrance association toys by providing an educational toy wherein common fragrances are correlated simultaneously with related shapes and with multiple pictorial information. Moreover, a further object of the present invention is to provide an educational toy wherein fragrance stickers are initially concealed from view to enhance a child's thought processes in correlating fragrances with shapes and pictures.

SUMMARY OF THE INVENTION

In accordance with the invention, a fragrance association toy is provided particularly for recreational and educational use by young children wherein common subjects and related shapes are correlated with related fragrances. The toy includes a plurality of game pieces bearing familiar pictorial or graphic subject matter or having common recognizable shapes associated with corresponding fragrance stickers for emitting fragrances related to the pictorial and shape information represented by the game pieces.

In a preferred form, the toy comprises a game board having a plurality of uniquely shaped recesses for seated reception in predetermined individual positions of a corresponding plurality of complementary-shaped game pieces. These game pieces have different familiar recognizable shapes and bear related familiar pictorial or graphic subject matter which can be associated by a child with the shapes of the board recesses into which the pieces fit. Upstanding knobs may be secured to the individual game pieces to facilitate handling particularly by small children.

At least some of the game pieces are further associated with individual fragrance stickers of the type commonly referred to as micro-fragrance stickers manufactured and sold by Minnesota Mining and Manufacturing Company (3M), Minneapolis, Minn. These fragrance stickers each include a paper base having an adhesive-coated rear surface for adherence in a selected position correlated with a selected one of the pieces and initially concealed from view when the associated piece is seated within the related board recess. A scratch-sensitive chemical coating applied to a front surface of the paper base emits, when lightly scratched, a fragrance correlated with the pictorial information and/or geometric shape of the associated game piece.

These fragrance stickers desirably further include pictorial or graphic subject matter on their front surfaces correlated with their associated game pieces.

In the preferred form of the invention, the fragrance stickers are mounted on the game board in positions respectively within the piece-receiving recesses. With this arrangement, the fragrance stickers are concealed when the associated game pieces are seated within their respective board recesses. However, removal of a piece exposes the underlying fragrance sticker which can then be scratched lightly by the child to emit the fragrance.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
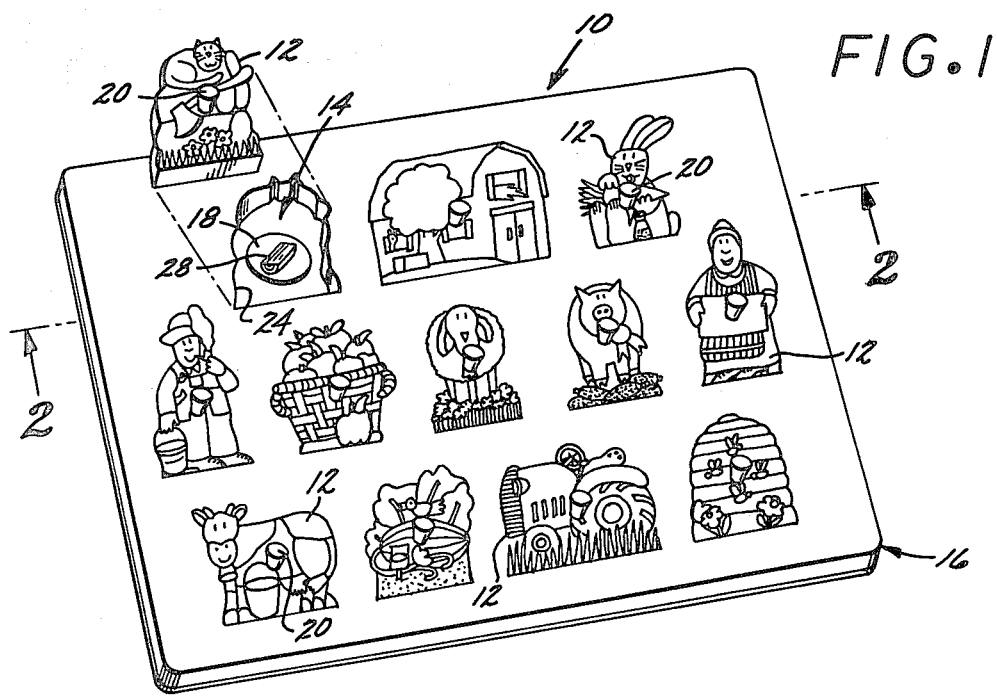
FIG. 1 is a perspective view illustrating a fragrance association toy embodying the novel features of the invention and depicting one game piece in exploded or removed relation with respect to an associated recess in a game board.

As shown in the exemplary drawings, an educational toy referred to generally by the reference numeral 10 is provided for educational and recreational use particularly by young children. The toy 10 provides a plurality of games pieces 12 shaped to fit within complementary-shaped recesses 14 in a game board 16 and further for individual association with correlated fragrance stickers 18.

The educational toy 10 of the present invention enhances the educational and recreational aspects of children's fragrance association products of the type requiring shape and picture association in combination with manual dexterity to place game pieces within associated recesses in a game board. The present invention correlates pictorial or graphic information borne by the game pieces and the recognizable geometric shapes of the game pieces with common related fragrances borne by the stickers which bear additional pictorial information. Accordingly, in the placement or removal of the game pieces from their respective board recesses, a child has the opportunity to experience and associate a variety of fragrances correlated with pictorial and geometric concepts, thereby expanding the educational value of the toy in a highly recreational, entertaining manner.

As shown in the illustrative drawings in accordance with one preferred form of the invention, the game pieces 12 comprise generally flat structures having uniquely different and typically irregularly shaped peripheral outlines. The game pieces 12 each bear pictorial or graphic information, such as a plurality of different scenes, subjects, objects, themes, or the like. For example, as depicted in FIG. 1, the pieces 12 may bear different pictorial information related to a common farm scene, with the shapes of the pieces 12 preferably having at least some recognizable relationship to the pictorial information on the individual pieces. In addition, to assist in manual handling particularly by small or extremely young children, each game piece 12 may conveniently have a small upstanding knob 20 secured centrally thereto by a nail, screw, or the like (not shown).

Figure 2:
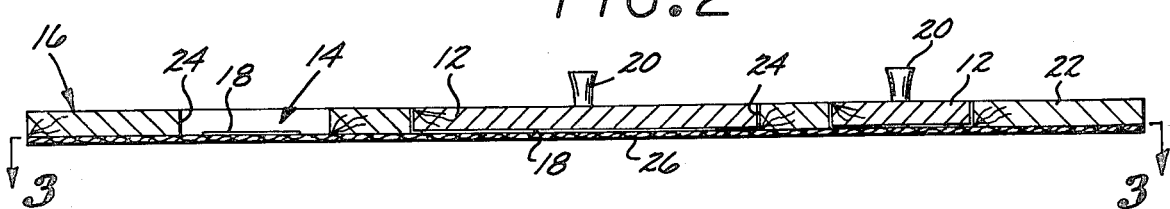
FIG. 2 is an enlarged transverse vertical section taken generally on the line 2—2 of FIG. 1.

The various game pieces 12 may be conveniently formed by cutting the pieces from a relatively thin planar sheet 22 of wood or the like, wherein this wooden sheet 22 advantageously is used as an integral part of the game board 16. More particularly, sawing of the pieces 12 from the wooden sheet 22 forms a plurality of open apertures 24 in the wooden sheet having a size and shape respectively conforming with the irregular shapes of the game pieces 12. These apertures 24 are closed at one side by a thin backing sheet 26 of paperboard or the like secured to the underside of the wooden sheet 22 as by use of a suitable adhesive. The backing sheet 26 thus cooperates with the wooden sheet 22 to define the game board 16 having the plurality of puzzle-receiving recesses 14 formed to open upwardly, as viewed in FIG. 2, for individual seated reception of the associated game pieces 12.

In accordance with the invention, the game pieces 12 are individually associated and correlated with a corresponding one of a plurality of fragrance stickers 18 designed to emit a familiar or otherwise recognizable fragrance which is associated in some manner with the shape and pictorial information represented by the respective game piece 12. These fragrance stickers 18 comprise so-called micro-fragrance stickers of the type manufactured and sold by Minnesota Mining and Manufacturing Company (3M) of Minneapolis, Minn. These stickers comprise an appropriately shaped paper base having a thin chemical coating on a front exposed surface thereof wherein this coating is adapted to emit a predetermined fragrance, in accordance with the chemical constituents forming the coating, when the exposed front surface is scratched by the child. Advantageously, the various fragrance stickers 18 are designed to emit different fragrances each having a unique correlation with the associated game piece 12.

Figure 3:
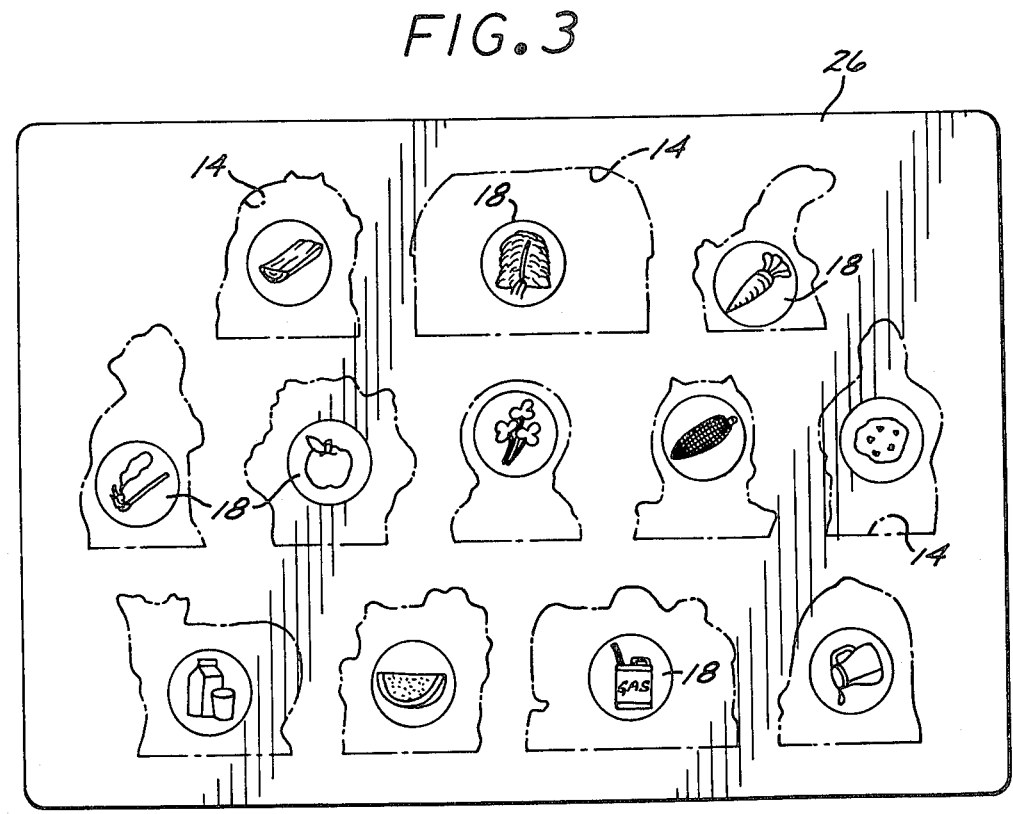
FIG. 3 is a horizontal section taken generally on the line 3—3 of FIG. 2 and illustrating in dotted lines the shapes of piece-receiving recesses in the game board.

In the preferred form, as shown in the illustrative drawings, the various fragrance stickers 18 are positioned within the piece-receiving recesses 14 of the game board 16. More particularly, the stickers 18 have a generally circular shape with an appropriate adhesive backing for adherence onto the backing sheet 26 of the board in a generally central position within the various board recesses 14. The fragrance stickers 18 are thus initially concealed by their associated game pieces 12 when those pieces are seated within the respective recesses 14. However, upon removal of a game piece 12, such as the cat and woodpile piece shown in exploded relation in FIG. 1, the correlated underlying fragrance sticker 18 is exposed and may be scratched lightly by the child to emit the correlated fragrance, such as the fragrance of redwood, cedar, pine, or the like. To enhance the educational value of the toy, the exposed front surface of the fragrance sticker also includes a pictorial illustration correlated with the associated game piece 12, such as the illustrated wood block 28 as depicted in FIGS. 1 and 3 in association with the cat/woodpile piece 12.

The remaining fragrance stickers 18 positioned within the other game-receiving recesses 14 are designed to emit different fragrances correlated with their respective game pieces 12. For example, the game piece depicting a rabbit, as shown in the upper right-hand corner of the illustrative embodiment, may be associated with an underlying fragrance sticker 18 bearing an illustration of a carrot and adapted when scratched to emit a carrot fragrance. The remaining fragrance stickers associated with the other pieces include different pictorial illustrations correlated with the respective emitted fragrances and the associated pieces 12.

The present invention thus provides a children's fragrance association toy of enhanced recreational and educational utility. This toy can be designed with the game pieces 12 adapted to fit within the individual separated recesses, as illustrated, or alternatively the fragrance stickers 18 can be mounted on the underside of the associated removable piece 12, as desired.

A variety of further modifications and improvements to the invention described herein are believed to be apparent to those skilled in the art. Accordingly, no limitation on the invention is intended, except by way of the appended claims.

What is claimed is:
1. An educational toy for children, comprising:
 a game board having a plurality of open recesses formed therein of generally different shapes;
 a plurality of game pieces of generally different shapes for respective seated reception into the recesses in said game board, each of said game pieces embodying recognizable and generally different subject matter; and
 a plurality of fragrance-emitting members each associated with a different one of said plurality of game pieces and adapted to emit a fragrance correlated with the recognizable subject matter embodied by the associated one of said game pieces, each of said fragrance emitting members being mounted in a position concealed from view when the associated one of said game pieces is seated within the respective one of said game board recesses.

2. The toy of claim 1 wherein the recesses formed in said game board are separated from one another.

3. The toy of claim 1 wherein said game board has a generally planar shape with the recesses formed therein to open upwardly for respective seated reception of said game pieces.

4. The toy of claim 1 wherein the recognizable subject matter of said game pieces comprises pictorial information on said pieces.

5. The toy of claim 1 wherein the recognizable subject matter of said game pieces is embodied in the geometric shapes of said pieces.

6. The toy of claim 1 wherein the recognizable subject matter of said game pieces is embodied in the combination of pictorial information on and the shapes of said pieces.

7. The toy of claim 6 wherein each of said members further includes additional pictorial information correlated with the associated one of said game pieces.

8. The toy of claim 1 including an upstanding knob mounted on each one of said game pieces to facilitate manual handling of said pieces.

9. The toy of claim 1 wherein each of said fragrance-emitting members comprises a fragrance sticker having an adhesive-coated rear surface and a chemically coated front surface adapted when scratched to emit a fragrance correlated with the associated one of said game pieces.

10. The toy of claim 9 wherein each of said fragrance stickers further includes pictorial information on its front surface correlated with the associated one of said game pieces.

11. An educational toy for children, comprising:
a plurality of game pieces each having a different shape and bearing graphic information related to its shape;
a plurality of fragrance-emitting members each associated with a different one of said plurality of game pieces and adapted to emit a recognizable fragrance correlated with the shape and graphic information embodied in the associated one of said game pieces, each of said members further including additional graphic information correlated with the associated one of said game pieces; and
means for mounting each of said fragrance-emitting members in a position for correlation with the associated one of said plurality of puzzle pieces.

12. The toy of claim 11 wherein said fragrance-emitting members are adapted to emit different fragrances.

13. The toy of claim 11 wherein each of said fragrance-emitting members comprises a fragrance sticker having an adhesive-coated rear surface and a chemically coated front surface adapted when scratched to emit a fragrance correlated with the associated one of said game pieces.

14. The toy of claim 11 wherein said mounting means comprises a game board having a plurality of open recesses formed therein for respective seated reception of said game pieces, each of said fragrance-emitting members being mounted in a position concealed from view when the associated one of said game pieces is seated within the respective one of said board recesses.

15. The toy of claim 11 wherein said mounting means comprises a game board having a plurality of open recesses formed therein for respective seated reception of said plurality of game pieces, said fragrance-emitting members being mounted within respective ones of the recesses in said board for concealment of said members when the associated pieces are seated within their respective recesses, each of said members being exposed upon removal of the associated one of said pieces from its respective recess in said board.

16. The toy of claim 15 wherein the recesses formed in said board are separated from one another.

17. An educational toy for children, comprising:
a generally flat game board having a plurality of upwardly open recesses of generally different shapes formed therein;
a plurality of game pieces having respective shapes for generally conforming seated reception into respective ones of the recesses in said game board, each of said game pieces bearing recognizable and generally different pictorial information; and
a plurality of fragrance stickers each mounted within a respective one of the recesses in said game board for association with a respective one of said game pieces, each of said fragrance stickers being respectively concealed and exposed when the associated one of said game pieces is respectively seated within and removed from its respective recess in said board, said fragrance stickers each having a chemically coated surface adapted when exposed and scratched to emit a recognizable fragrance correlated with the pictorial information on the associated one of said game pieces, each of said fragrance stickers further including pictorial information correlated with the pictorial information on the associated one of said game pieces and exposed upon removal of the associated one of said game pieces from its respective recess in said board.

18. The toy of claim 17 wherein said game board comprises a generally planar sheet, said pieces being cut from said planar sheet to form a plurality of open apertures in said planar sheet, said board further including a backing sheet secured to one side of said planar sheet to form said board and to close one side of the apertures therein to form the upwardly open recesses in said board.

* * * * *